United States Patent [19]

Ida et al.

[11] Patent Number: 4,697,965

[45] Date of Patent: Oct. 6, 1987

[54] APPARATUS FOR PREVENTING INVASION OF CUTTING LIQUID IN REPLACEABLE HEAD TYPE MACHINE TOOL

[75] Inventors: Jinsei Ida, Sayama; Yoshio Hagimoto, Niiza; Makoto Ishikawa, Kamifukuoka, all of Japan

[73] Assignee: Honda Giken Kogyo Kabushiki Kaisha, Tokyo, Japan

[21] Appl. No.: 839,006

[22] Filed: Mar. 12, 1986

[30] Foreign Application Priority Data

Apr. 18, 1985 [JP] Japan .................................. 60-81341

[51] Int. Cl.⁴ ............................................. B23B 51/06
[52] U.S. Cl. ......................................... 408/56; 173/57
[58] Field of Search ............... 173/57, 71, 73; 408/56, 408/57, 59, 234; 409/135, 136

[56] References Cited

U.S. PATENT DOCUMENTS

| 3,382,739 | 5/1968 | Jacobson | 409/135 |
| 3,868,195 | 2/1975 | Anderson et al. | 409/135 |
| 4,499,969 | 2/1985 | Toombs | 408/56 X |
| 4,570,952 | 2/1986 | Heimbergner et al. | 408/56 X |
| 4,624,608 | 11/1986 | Shiomi et al. | 408/56 |

*Primary Examiner*—E. R. Kazenske
*Assistant Examiner*—Willmon Fridie, Jr.
*Attorney, Agent, or Firm*—Armstrong, Nikaido, Marmelstein & Kubovcik

[57] ABSTRACT

An accumulator tank is mounted on a working head of a replaceable head type machine tool. The tank is connected to each spindle housing on the head to deliver a pressure fluid and jet the same forwardly through the interior of the housing and out an insertion gap surrounding a spindle mounted in the housing. Pressure fluid is supplied to the tank when the head is coupled to a driving unit through respective connecting opening and supply openings. An air jetting opening made in a docking portion of the driving unit to prevent foreign material from lodging therein and blocking entry of a corresponding pin on the working head during coupling can also be the supply opening.

2 Claims, 5 Drawing Figures

APPARATUS FOR PREVENTING INVASION OF CUTTING LIQUID IN REPLACEABLE HEAD TYPE MACHINE TOOL

BACKGROUND OF THE INVENTION

This invention relates to an apparatus for preventing any invasion of a cutting liquid back in a replaceable head type machine tool, and is more particularly directed to an apparatus for preventing any invasion of a cutting liquid into a spindle housing for inserting and supporting a spindle on a working head in the foregoing machine tool.

A known machine tool of this kind is disclosed in Japanese Unexamined Patent Application Publication Sho No. 53-115992, for instance. A driving unit is provided which is movable to advance and retreat in relation to a workpiece set table. An annular rail around the driving unit comprises a movable rail on a front side and a stationary rail on a rear side. Plural working heads are mounted turnably on the annular rail so that any desired one thereof may be selected to be positioned on the movable rail so that by an advance movement of the driving unit, the selected working head is advanced towards the set table together with the movable rail under the coupled condition thereof with the driving unit. The workpiece set on the set table is applied with a predetermined work by a tool on a forward end of a tool spindle provided on the head.

It has been usual hitherto with this type of apparatus that a sealing member is applied to an inner circumference of a forward end portion of the housing in order to prevent a cutting liquid, chips or the like from invading into the spindle housing on the head through an insertion gap around the spindle on a forward end portion thereof.

This type of apparatus, however, is inconvenient in that, if the amount of sealing provided by sealing member decreases as a result of wearing or deterioration thereof, it often happens that the cutting liquid penetrates into the housing. This is especially so in the situation where the spindle is rotated at a high speed as in the case of use of a FB spindle. The cutting liquid is jetted against the tool under a high pressures, so that the cutting liquid is liable to penetrate into the housing. This creates the problem that a lubricant enclosed in a bearing portion in the housing is dissolved by the invading cutting liquid resulting in a decrease of lubrication. As a result, there is liable to occur such a trouble as a seizure of the bearing or the like.

Additionally, also at the time when the working head is released from its coupling with the driving unit and is ready to wait on the stationary rail for the next work, it often happens that the cutting liquid previously adhered to and remaining at a place near the forward end of the housing is drawn into the housing as a result of lowering in an internal pressure of the housing caused by the cooling thereof.

OBJECT AND SUMMARY OF THE INVENTION

This invention has for its object to provide an apparatus which can remove the foregoing problems and can prevent not only the invasion of the cutting liquid into the housing during the time of working but also the drawing in of the cutting liquid thereinto during the time of waiting.

For achieving the foregoing object, according to this invention, in a replaceable head type machine tool of the type that there is provided a driving unit which is movable to advance and retreat in relation to a workpiece set table so that, by an advance movement of the driving unit, a working head selected to be at a front position of the driving unit may be coupled therewith and be further advanced thereby towards the set table, and a workpiece set on the set table may be applied with a predetermined work by a tool on a forward end of a tool spindle provided on the working head, the invention is characterized in that there is provided on the head an accumulator tank for a pressure fluid such as a pressure air or the like which is connected by piping, to the spindle housing on the head that inserts and supports the spindle so that a pressure fluid discharged from the tank may be jetted forwards, through the interior of the housing, from an insertion gap around the spindle on a forward end of the housing; additionally the driving unit is provided with a supply opening connected to a pressure fluid source, and the working head is provided with a connecting opening arranged to be connected to the supply opening at the time of the coupling thereof with the driving unit so that a pressure fluid discharged from the connecting opening may flow into the tank.

Thus, according to this invention, there can be performed such an operation as described below. Namely, during the time of working of the workpiece by the working head, the accumulator tank mounted on the head is supplied with the pressure fluid through the supply opening of the driving unit and the connecting opening of the head, and at the same time the pressure fluid is supplied to the spindle housing on the head from the tank, and is jetted forwards from the insertion gap around the tool spindle on the forward end of the housing, whereby any invasion of the cutting liquid into the housing can be prevented. Even when the head is released from the coupling condition thereof with the driving unit and is ready for the next work, the pressure liquid stored in the accumulator tank is supplied to the housing, whereby any invasion of the cutting liquid into the housing otherwise caused by lowering in the internal pressure of the housing can also be prevented.

BRIEF DESCRIPTION OF THE DRAWINGS

The above and other objects and the attendant advantages of the present invention will become readily apparent by reference to the following detailed descriptions when considered in conjunction with the accompanying drawings wherein.

DETAILED DESCRIPTION OF A PREFERRED EMBODIMENT

One embodying example of this invention will be explained with reference to the accompanying drawings.

Figure 1:
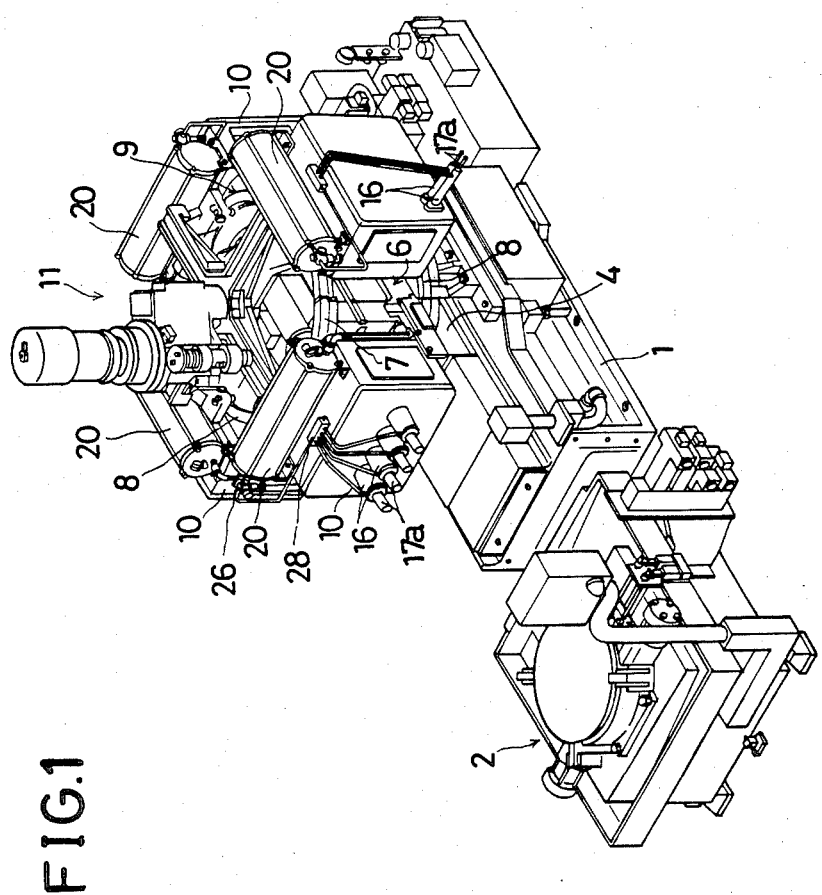
FIG. 1 is a perspective view of a replaceable head type machine tool including one embodiment of this invention.
Figure 2:
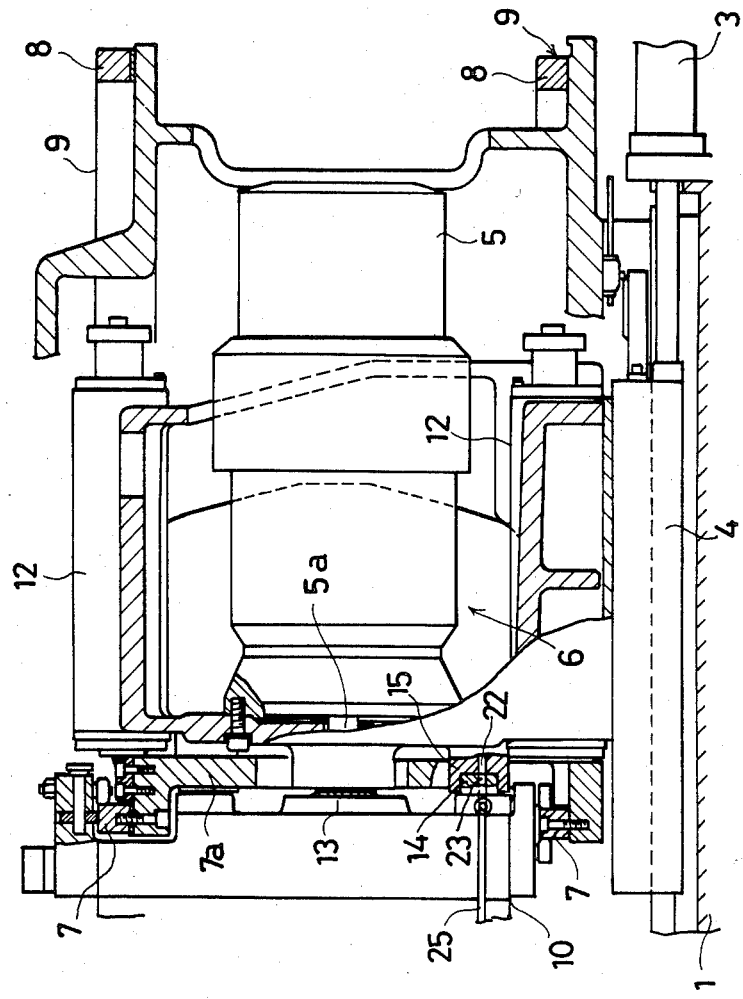
FIG. 2 is a sectional side view of an important portion thereof.
Figure 4:
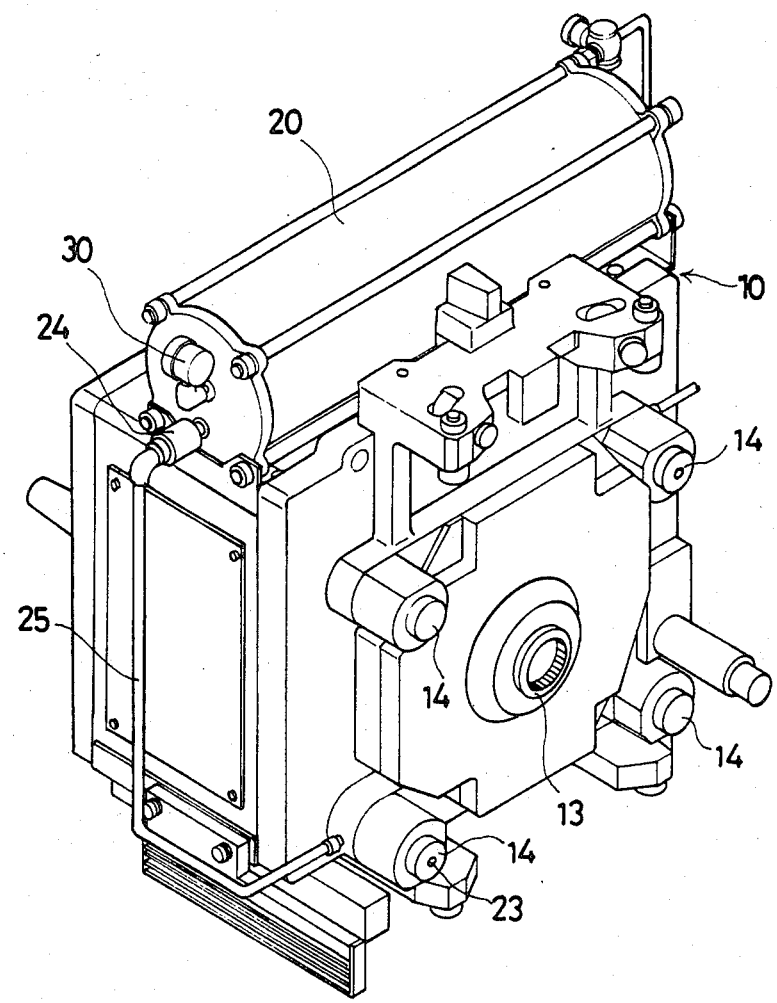

Referring to FIGS. 1 and 2, a machine base 1 has a workpiece set table 2 provided in front of the same. A driving unit 6 having a driving motor 5 mounted thereon is provided on the machine base 1 on a slide table 4 and is movable forwards and rearwards by the action of an oil pressure cylinder 3. A pair of upper and lower annular rails 9, 9, each comprising a movable rail 7 on a front side and a stationary rail 8 on a rear side fixed to the machine base 1, are provided around a retreated position of the driving unit 6. Additionally, a plural working heads 10 are mounted on the annular rails 9, 9 and are arranged to be movable around along on the annular rails 9, 9 by an index means 11 provided on an upper side thereof so that any desired one thereof may be selected to be at a front position of the driving unit 6, that is, on the movable rails 7, 7. By an advance movement of the driving unit 6 from the retreated position thereof, the selected working head 10 is coupled therewith and is further advanced together with the movable rails 7, 7 for applying a predetermined work onto the workpiece on the set table 2. The movable rails 7, 7 are attached to a supporting frame 7a which is supported on a front side of the driving unit 6 and is movable forwards and rearwards relative thereto by action of a cylinder 12. When the driving unit 6 is intended to be advanced from the retreated position thereof, the movable rails 7,7 are, in the first place, given a retreat movement of a predetermined stroke in relation to the driving unit 6, whereby a power coupling 13 and plural pins 14 provided on a rear surface of the working head 10 as shown clearly in FIG. 4 may be mounted respectively on a motor output shaft 5a and in plural docking portions 15 provided on a front surface of the driving unit 6 to couple the head 10 and the unit 6 together as shown clearly in FIG. 2.

Here, each of the working heads 10 is provided with plural tool spindles 17 inserted through and supported on respective spindle housings 16 which are provided on a front surface of the head 10 and project therefrom so that, by the coupling between the working head 10 and the driving unit 6, each spindle 17 may be rotated through an internal transmission mechanism connected to the foregoing power coupling 13. In this manner, a predetermined work on the workpiece may be carried out by a tool 17a on a forward end of each spindle 17.

Figure 3:
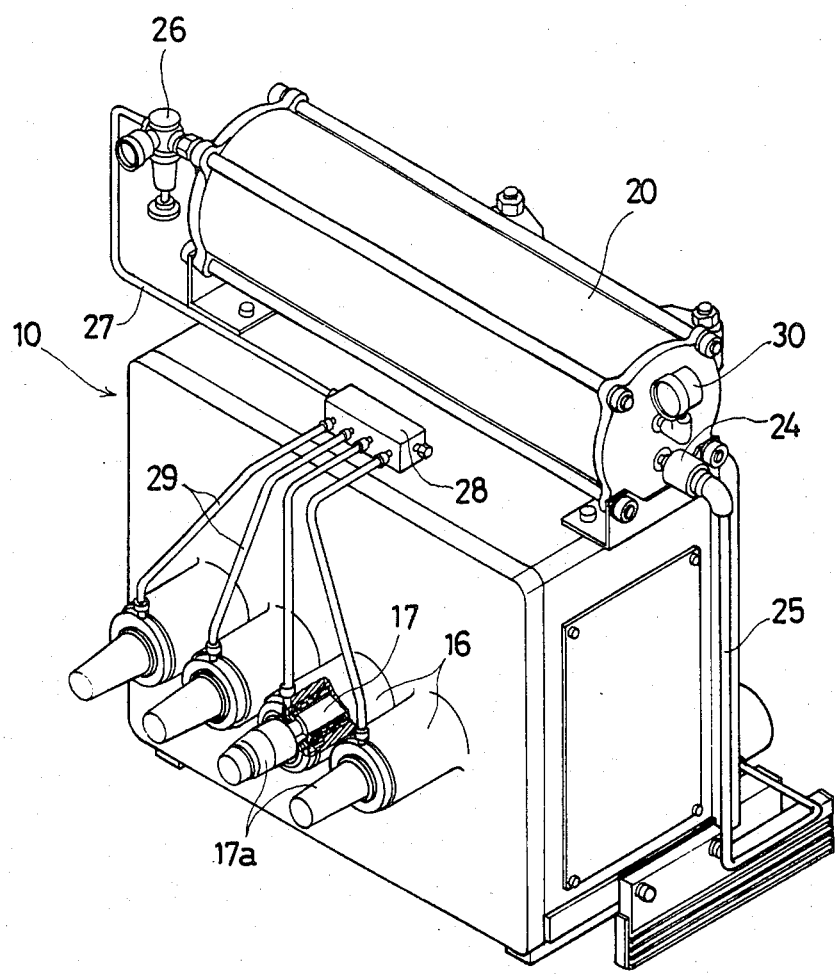
FIGS. 3 and 4 are perspective views, viewed respectively from front and rear, of a working head thereof.
Figure 5:
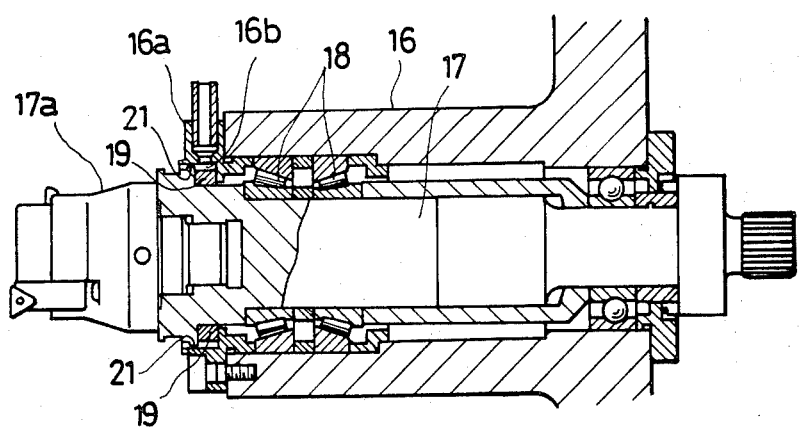
FIG. 5 is an enlarged sectional side view of a spindle housing portion thereof.

FIG. 3 shows the working head 10 positionable on the movable rails 7, 7 in FIG. 1. This working head 10 is provided with four tool spindles 17 comprising FB (Fine Balling) spindles. A detailed construction of one of them is shown in FIG. 5. Namely, each spindle 17 is inserted and supported through fine bearings 18, in each tubular spindle housing 16 projecting integrally from the front surface of the working head 10. An annular member 16a for labyrinth sealing is attached to a forward end portion of the housing 16, and a dust seal 19 is mounted therein.

According to the characteristic feature of this invention, there is mounted on the working head 10 an accumulator tank 20 for a pressure fluid, for instance, a pressure air. The tank 20 is connected, by piping, to the housings 16 so that the pressure air may be jetted forwards, through the interior of each housing 16, from an insertion gap 21 around the tool spindle 17 on a forward end of the housing 16. Additionally, a supply opening 22 connected to an air source (not illustrated) is made in the driving unit 6. A connecting opening 23 which is to be connected to the supply opening 22 at the time of coupling between the working head 10 and the driving unit 6 is made in the working head 10 so that the pressure air from the connecting opening 23 can flow into the tank 20.

More in detail, in the illustrated example, air jetting openings are made in the docking portions 15 on the front surface of the driving unit 6 in order to prevent foreign material from adhering to the docking portion 15 and being caught between the docking portion 15 and the pin 14 when the coupling of the working head is made with the driving head. One of these air jetting openings is used also for the supply opening 22. Any desired one or more the foregoing pins 14 on the rear surface of the working head 10 can be provided with the connecting opening 23. A conduit pipe 25 connected to the connecting opening 23 is connected to a check valve 24 on the upper surface of the head 10. A conduit pipe 27 connected to a regulator valve 26 on an outlet side on the other end of the tank 20 is connected to a flow rate control valve 28. Plural pipes 29 are connected to the valve 28 and to each corresponding annular member 16a provided on the forward end portion of each housing 16 so that the pressure air may be jetted forwards from the foregoing gap 21 through a space 16b formed around the dust seal 19 mounted in the annular member 16a.

The accumulator tank 20 is provided such that the internal pressure thereof may be kept at a predetermined pressure of 5–6 kg/cm$^2$ regulated by another regulator valve 30 on the inlet side thereof. The delivery pressure is set to be about 0.2–2.0 kg/cm$^2$ by the regulator valve 26 on the outlet side thereof. Additionally, the amount of air supplied to each housing 16 may be controlled by the flow rate control valve 28 in accordance with the diameter and the rotation speed of the tool spindles 17.

The above explanation has been made about mounting the accumulator tank 20 on the selected working head 10 having FB spindles. In the illustrated example, however, the accumulator tank 20 is mounted similarly also on each of the remaining working heads 10 as shown in FIG. 1.

Next, the operation of the foregoing example will be explained as follows:

By an advance movement of the driving unit 6, the work head 10 selected on the movable rails 7 is coupled therewith and is advanced by further advancing of the driving unit 6 towards the workpiece set table 2 for applying a work onto the workpiece set on the table 2. Each spindle housing 16 provided on the working head 10 is supplied with the pressure air from the supply opening 22 made in the driving unit 6 through the connecting opening 23 of the working head 10 connected thereto and the accumulator tank 20. The pressure air is jetted forwards though the insertion gap 21 around the tool spindle 17 provided on the forward end of each housing 16. The jetting of the pressure air can prevent the cutting liquid blown against the tool portion 17a on the forward end of the spindle 17 from invading into the housing 16. Accordingly, even if there is caused wearing or deterioration of the dust seal 19, there is not caused the problem of dissolving of a lubricant as a result of penetration of the cutting liquid into any diposed portion of the fine bearing 18 and others.

Additionally, during the time of this work, the pressure air is fully stored in the accumulator tank 20. During the time when the working head 10 is released from its coupling with the driving unit 6 and is ready on the stationary rail 8 to wait for the next work, the pressure air discharged from the tank 20 is supplied to each housing 16 in almost the same manner as above. Thus, even while the working head is waiting, the jetting of air from the accumulator tank can prevent the cutting liquid previously adhered to and remaining at a position near the forward end of each housing 16 from being drawn into the housing 16 due to the lowering in the internal pressure of the housing 16 while cooling off.

Thus, according to this invention, the accumulator tank is mounted on the working head and is arranged so that pressure fluid is jetted forwards from the insertion gap around the tool spindle on the forward end of the spindle housing at any time when the workpiece is being worked and when the working head is waiting, so that any invasion of the cutting liquid into the housing can be surely prevented. In this manner a potential problem of seizing of the spindle supporting portion resulting from dissolving of the lubricant can be prevented.

It is readily apparent that the above-described apparatus for preventing invasion of cutting liquid in replaceable head type machine tool meets all of the objects mentioned above and also has the advantage of wide commercial utility. It should be understood that the specific form of the invention hereinabove described is intended to be representative only, as certain modification within the scope of these teachings will be apparent to those skilled in the art.

Accordingly, reference should be made to the following claims in determining the full scope of the invention.

What is claimed is:

1. In a replacable head type machine tool including a driving unit which is movable to advance and retreat in relation to a workpiece set table so that, by an advance movement of the driving unit, a working head selected to be at a front position of the driving unit may be coupled therewith and be further advanced thereby towards the set table, and a workpiece set on the set table may be applied with a predetermined work by a tool on a forward end of a tool spindle provided on the working head, an apparatus for preventing invasion of cutting liquid characterized in that an accumulator tank is mounted on the head for a pressure fluid which is connected, by piping, to such a spindle housing on the head that inserts and supports the spindle so that a pressure fluid discharged from the tank may be jetted forwards, through the interior of the housing, from an insertion gap around the spindle on a forward end of the housing; and the driving unit is provided with a supply opening connected to a pressure fluid source, and the working head is provided with a connecting opening arranged to be connected to the supply opening at the time of the coupling thereof with the driving unit, the connecting opening being connected, by piping, to the accumulator tank so that a pressure fluid discharged from the pressure fluid source flows through the supply opening and the connecting opening into the tank when the working head is coupled to the driving unit.

2. An apparatus as claimed in claim 1, wherein the driving unit has on its front surface at least one docking portion, and the working unit has on its rear surface at least one pin for being mounted in the docking portion, and an air jetting opening made in the docking portion for preventing foreign material from adhering to the docking portion serves as said supply opening when the working head is coupled to the driving unit, and the connecting opening is made in the pin.

* * * * *